(12) United States Patent
Shimojou et al.

(10) Patent No.: US 10,616,854 B2
(45) Date of Patent: Apr. 7, 2020

(54) COMMUNICATION CONTROL METHOD AND COMMUNICATION SYSTEM FOR CHANGING A TRACKING AREA WHEN A CONTROL PLANE AND USER PLANE ARE SEPARATED

(71) Applicant: NTT DOCOMO, INC., Chiyoda-ku (JP)

(72) Inventors: Takuya Shimojou, Chiyoda-ku (JP); Atsushi Minokuchi, Chiyoda-ku (JP); Tomoki Shibahara, Chiyoda-ku (JP); Masayoshi Shimizu, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/082,555

(22) PCT Filed: Mar. 3, 2017

(86) PCT No.: PCT/JP2017/008555
§ 371 (c)(1),
(2) Date: Sep. 6, 2018

(87) PCT Pub. No.: WO2017/169513
PCT Pub. Date: Oct. 5, 2017

(65) Prior Publication Data
US 2019/0037521 A1 Jan. 31, 2019

(30) Foreign Application Priority Data

Mar. 31, 2016 (JP) ................................. 2016-071078

(51) Int. Cl.
*H04W 24/00* (2009.01)
*H04W 4/00* (2018.01)
(Continued)

(52) U.S. Cl.
CPC ........... *H04W 64/00* (2013.01); *H04W 36/12* (2013.01); *H04W 40/20* (2013.01); *H04W 60/00* (2013.01); *H04W 68/02* (2013.01); *H04W 76/10* (2018.02)

(58) Field of Classification Search
CPC ...... H04W 64/00; H04W 76/10; H04W 68/02
(Continued)

(56) References Cited

U.S. PATENT DOCUMENTS

| 2010/0135245 | A1* | 6/2010 | Zhu | ........................ | H04W 76/32 370/331 |
| 2011/0113278 | A1* | 5/2011 | Yin | ..................... | H04L 12/4633 714/4.1 |

(Continued)

FOREIGN PATENT DOCUMENTS

EP 3 439 339 A1 2/2019

OTHER PUBLICATIONS

International Search Report and Written Opinion dated May 23, 2017 in PCT/JP2017/008555 filed Mar. 3, 2017.

(Continued)

*Primary Examiner* — German Viana Di Prisco
*Assistant Examiner* — Mark G. Pannell
(74) *Attorney, Agent, or Firm* — Oblon, McClelland, Maier & Neustadt, L.L.P.

(57) ABSTRACT

An SGW-C acquires correlation information in advance and retrieves an SGW-U corresponding to a tracking area of a movement destination of UE with reference to the correlation information. An MME issues a request for connection between the SGW-U retrieved by the SGW-C and an eNB. In this way, since the correlation information in which SGW-Us and tracking areas are correlated with each other is (Continued)

stored, it is possible to appropriately change a tracking area even in a situation in which a control plane and a user plane are separated.

2 Claims, 7 Drawing Sheets

(51) Int. Cl.
  *H04L 12/28* (2006.01)
  *H04W 64/00* (2009.01)
  *H04W 76/10* (2018.01)
  *H04W 40/20* (2009.01)
  *H04W 36/12* (2009.01)
  *H04W 60/00* (2009.01)
  *H04W 68/02* (2009.01)

(58) Field of Classification Search
  USPC .................................................. 455/456.1
  See application file for complete search history.

(56) References Cited

U.S. PATENT DOCUMENTS

| | | | | |
|---|---|---|---|---|
| 2014/0302874 A1* | 10/2014 | Zakrzewski | ............ | H04W 4/70 455/456.1 |
| 2015/0334606 A1* | 11/2015 | Sun | ...................... | H04W 36/00 370/331 |
| 2016/0157274 A1* | 6/2016 | Akiyoshi | .............. | H04W 88/16 370/254 |
| 2016/0337454 A1* | 11/2016 | Hoffmann | ................ | H04L 47/72 |
| 2017/0126618 A1* | 5/2017 | Bhaskaran | .......... | H04L 61/2007 |
| 2017/0163727 A1* | 6/2017 | Dolby | ................ | H04L 12/4633 |
| 2017/0339611 A1* | 11/2017 | Landais | ............ | H04W 52/0216 |
| 2017/0374542 A1* | 12/2017 | Ryu | ........................ | H04W 8/08 |
| 2019/0007984 A1* | 1/2019 | Kuroda | ................... | H04W 8/02 |
| 2019/0014550 A1* | 1/2019 | Rommer | ................ | H04L 41/12 |
| 2019/0021130 A1* | 1/2019 | Kim | ...................... | H04W 36/02 |

OTHER PUBLICATIONS

"Solution to Key Issue 4," Huawei, HiSilicon, 3GPP SA WG2 Meeting #113, S2-160923, 3GPP, Jan. 25-29, 2016, pp. 1-3.

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401, V13.6.1 (Mar. 2016), 3GPP, Mar. 24, 2016, pp. 1-365.

"Introducing eDRX for High latency communication," Ericsson, Qualcomm Incorporated, 3GPP TSG-SA WG2 Meeting #110, S2-152575, 3GPP, Jul. 6-10, 2015, pp. 1-17.

International Preliminary Report on Patentability dated Oct. 18, 2018 in PCT/JP2017/008555, 5 pages (submitting English translation Only).

Ericsson, "TAI List problem and User plane area Mapping" SA WG2 Meeting #113, S2-160922, 2016, 6 pages.

Extended European Search Report dated Nov. 20, 2019 in European Patent Application No. 17774058.6, 11 pages.

3rd Generation Partnership Project; Technical Specification Group Services and System Aspects; Study on control and user plane separation of EPC nodes (Release 14), 3GPP Standard; 3GPP TR 23.714, 3rd Generation Partnership Project (3GPP), Mobile Competence Centre; 650, Route Des Lucioles; F-06921 Sophia-Antipolis Cedex; France, vol. SA WG2, No. Vo.3.0, XP051087749, Feb. 11, 2016, pp. 1-42.

\* cited by examiner

| SGW-U | TA |
|---|---|
| SGW-U1 | TA1-3,6-8,11-13,16-18 |
| SGW-U2 | TA3-5,8-10,13-15,18-20 |

COMMUNICATION CONTROL METHOD AND COMMUNICATION SYSTEM FOR CHANGING A TRACKING AREA WHEN A CONTROL PLANE AND USER PLANE ARE SEPARATED

TECHNICAL FIELD

The invention relates to a communication control method and a communication system.

BACKGROUND ART

In the related art, Non Patent Literature 1 describes that when certain user equipment (UE) has requested change of a tracking area, a mobility management entity (MME) identifies a serving gateway (SGW) corresponding to a tracking area of a movement destination of the UE with reference to information indicating tracking areas corresponding to SGWs.

Regarding SGWs, a technique for separately selecting an SGW corresponding to a control plane (hereinafter referred to as a "control plane") which is a path for transmitting a control signal for a communication service used by a terminal, and an SGW corresponding to a user plane (hereinafter referred to as a "user plane") which is a path for transmitting a user signal for the communication service has been studied.

CITATION LIST

Non Patent Literature

Non Patent Literature 1 is "3GPP TS 23.401".

SUMMARY OF INVENTION

Technical Problem

In a case where a control plane and a user plane are separately selected, an MME cannot identify a tracking area corresponding to the user plane and thus may not be able to be appropriately connected to a new tracking area.

Therefore, in order to solve the above-mentioned problem, an objective of the invention is to provide a communication control method and a communication system that can appropriately change a tracking area even in a situation in which a control plane and a user plane are separated.

Solution to Problem

In order to achieve the above-mentioned objective, a communication control method according to an embodiment of the invention is a communication control method which is performed by a communication system, the communication control method including: an acquisition step of acquiring correlation information in which a second device corresponding to a first device that transmits and receives a control signal for a communication service used by a terminal using a control plane which is a path for transmitting the control signal and which transmits and receives a user signal for a communication service using a user plane which is a path for transmitting the user signal, and a tracking area of the second device are correlated with each other; a determination step of determining the second device corresponding to a tracking area of a movement destination of the terminal with reference to the correlation information acquired in the acquisition step; and a connection request step of issuing a request for connection between the second device determined in the determination step and a base station.

A communication system according to an embodiment of the invention is a communication system including: acquisition means that acquires correlation information in which a second device corresponding to a first device that transmits and receives a control signal for a communication service used by a terminal using a control plane which is a path for transmitting the control signal and which transmits and receives a user signal for a communication service using a user plane which is a path for transmitting the user signal, and a tracking area of the second device are correlated with each other; determination means that determines the second device corresponding to a tracking area of a movement destination of the terminal with reference to the correlation information acquired by the acquisition means; and connection request means that issues a request for connection between the second device determined by the determination means and a base station.

According to this invention, since the correlation information in which the second device and the tracking area of the second device are correlated with each other is acquired, and the second device corresponding to the tracking area of the movement destination of the terminal is determined with reference to the correlation information, it is possible to appropriately change a tracking area even in a situation in which a control plane and a user plane are separated.

In the communication control method according to the embodiment of the invention, the determination step may be performed on the basis of a paging response. In this case, it is possible to appropriately change a tracking area depending on paging.

In the communication control method according to the embodiment of the invention, the determination step may be performed after a tracking area change request has been received from the base station. In this case, even when a tracking area update request has been received, it is possible to appr iately change a tracking area.

In the communication control method according to the embodiment of the invention, there may be a plurality of second devices, the connection request step may include: issuing a request for connection between the second device corresponding to a tracking area before the terminal moves and the second device determined in the determination step, before issuing a request for connection between the second device and the base station; and transmitting buffered data from the second device corresponding to the tracking area before the movement to the determined second device, after the connection has been set up. In this case, even when the second device corresponding to the tracking area before the terminal moves stores downlink data, the second device corresponding to the tracking area before the terminal moves and the second device determined in the determination step can be connected to each other, and thus it is possible to transmit the downlink data to the second device corresponding to the terminal, after movement.

Advantageous Effects of Invention

According to the invention, it is possible to appropriately change a tracking area even in a situation in which a control plane and a user plane are separated.

DESCRIPTION OF EMBODIMENTS

Hereinafter, an embodiment of the invention will be described in detail with reference to the accompanying drawings. In description with reference to the drawings, the same elements will be referred to by the same reference signs and description thereof will not be repeated.

Figure 1:
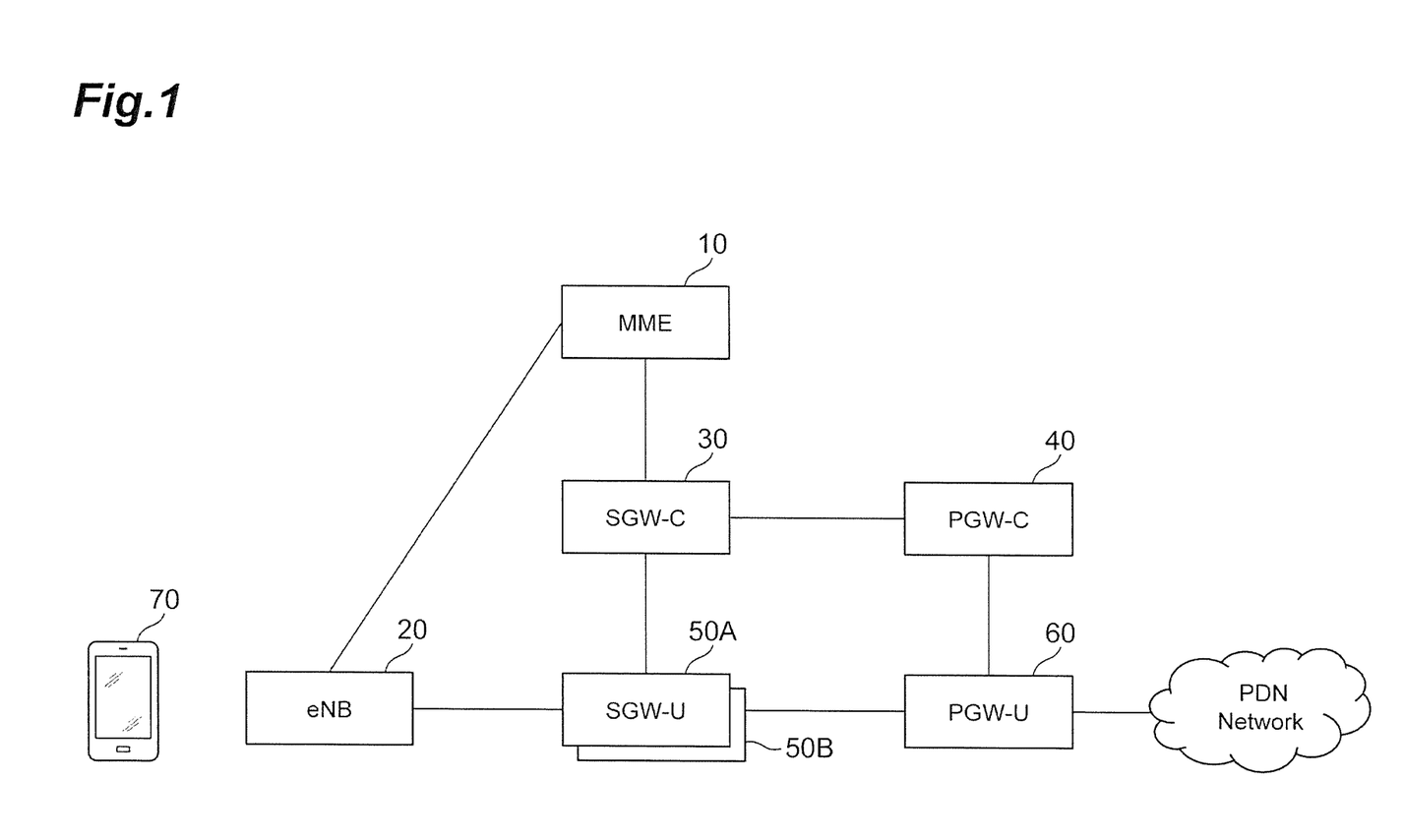
FIG. 1 is a diagram illustrating a system configuration of a communication system according to an embodiment of the invention.

FIG. 1 is a diagram illustrating a system configuration of a communication system according to an embodiment of the invention. This communication system includes a mobility management entity (MME) 10, an eNB 20, an SGW-C 30, a PGW-C 40, an SGW-U 50 (an SGW-U 50A and an SGW-U 50B), a PGW-U 60, and a user equipment (UE) 70. Identifiers are set in the SGW-U 50A and the SGW-U 50B. The identifier of the SGW-U 50A is "SGW-U1" and the identifier of the SGW-U 50B is "SGW-U2."

The MME 10 is a device that connects the SGW-U 50 corresponding to a tracking area of the UE 70, and the eNB 20 with change of the tracking area. Here, the MME is a unit that performs location management and authentication control of UEs 70 located in a Long Term Evolution (LTE) network and a process of setting a communication path of user data between the SGW-U 50 and the eNB 20. The MME 10 also performs a process of setting a path of control data in the SGW-C 30.

The eNB 20 is a radio base station that is connected to the MME 10 and is a device that has a radio access control function. The eNB 20 has a reception control function when a call is transmitted from one UE 70, and a paging function of calling one UE 70 when a call is transmitted from another UE 70 to the corresponding UE 70, as basic functions. The eNB 20 stores an address of the MME 10 and notifies the address of a paging response and a tracking area update request when the paging response and the tracking area update request have been received from the UE 70.

The SGW-C 30 is a packet switching device compatible with LTE, and transmits and receives a control signal which is used to provide a communication service used by the UE 70 to and from a packet data network gateway (PGW) by using a control plane which is a path for transmitting the control signal. The SGW-C 30 may be provided to correspond to requirements of a plurality of communication services. The SGW-C 30 manages one or more SGW-Us 50.

The PGW-C 40 is a junction with a packet data network (PDN) and is a gateway that performs allocation of IP addresses and transmission of packets to the SGW-C 30. That is, the PGW-C 40 is connected to the SGW-C 30 and transmits and receives a control signal to and from the SGW-C 30. The PGW-C 40 may be provided to correspond to requirements of a plurality of communication services.

The SGW-U 50 is a packet switching device compatible with LTE and transmits and receives a user signal which is used to provide a communication service used by the UE 70 to and from a PGW by using a user plane which is a path for transmitting the user signal. The SGW-U 50 may be provided to correspond to requirements of a plurality of communication services. The SGW-U 50 assumes one or more tracking areas as its service area.

The PGW-U 60 is a junction with the PDN and is a gateway that performs allocation of IP addresses and transmission of packets to the SGW-Us 50. That is, the PGW-U 60 is connected to the SGW-Us 50 and transmits and receives a user signal to and from the SGW-C 30. The PGW-U 60 may be provided to correspond to requirements of a plurality of communication services.

UE 70 such as a smartphone or a tablet terminal can be communicatively connected to the communication system to communicate therewith. The UE 70 stores information indicating a plurality of communication services which can be used by the UE and transmits the information to the eNB 20. A communication service is a service using communications, such as transmission of a moving image and vehicle-to-vehicle communication. Network requirements for the services are different from each other. The UE 10 stores service types which are information indicating the network requirements as information indicating the communication services. A list of tracking areas is allocated to the UE 70.

In the communication system, a plurality of eNBs 20 are associated with a single tracking area and a plurality of SGW-Us 50 are associated with a single SGW-C 30. The eNBs 20 belonging to the same service area (an area managed by a SGW-U 50) may be connected to different SGW-Us 50.

Elements of the MME 10 and the SGW-C 30 having features of the communication system will be described below with reference to FIG. 2.

Figure 2:
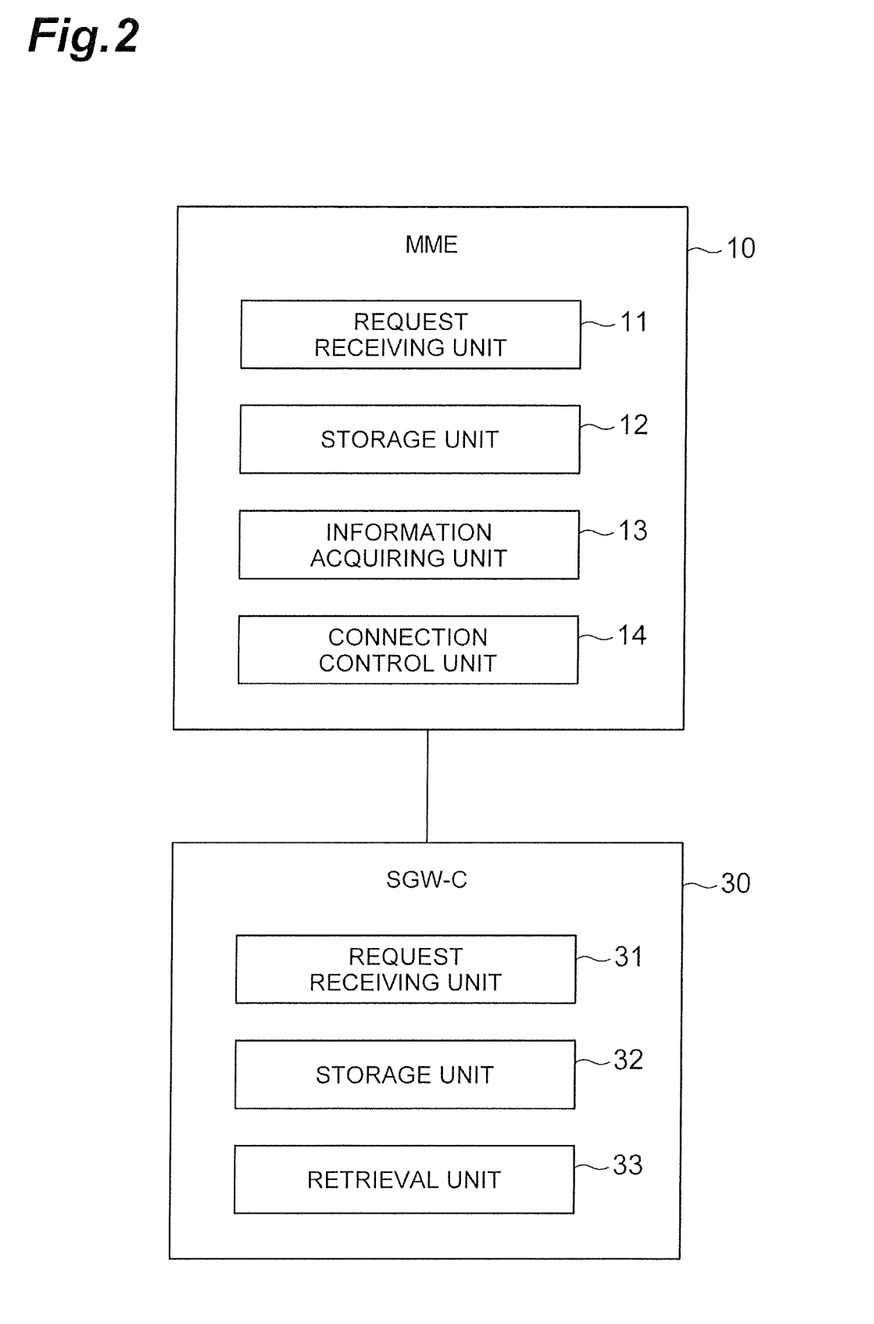
FIG. 2 is a diagram illustrating functional blocks of an MIME device according to the embodiment of the invention.

As illustrated in FIG. 2, the MME 10 includes a request receiving unit 11, a storage unit 12, an information acquiring unit 13, and a connection control unit 14 (connection request means). The request receiving unit 11 is a unit that receives various requests. Specifically, the request receiving unit 11 receives a tracking area update request from the eNB 20, receives a paging request from the SGW-C 30, or receives a response to the paging request from the eNB 20. When the paging request has been received from the SGW-C 30, when the tracking area update request has been received from the eNB 20, and when the paging response has been received from the eNB 20, the request receiving unit 11 also receives an identifier of the UE 70 from the eNB 20 or the SGW-C 30. When the tracking area update request has been received from the eNB 20 and when the paging response has been received from the eNB 20, the request receiving unit 11 also receives information of the eNB 20 (an identifier of the eNB 20).

When the tracking area update request has been received and when the paging response has been received from the eNB 20, the request receiving unit 11 sends the identifier of the UE 70 and the tracking area of the UE 70 to the information acquiring unit 13.

When the paging request has been received from the SGW-C 30, the request receiving unit 11 sends the identifier of the UE 70 to the connection control unit 14.

The storage unit 12 stores information (first information) in which the identifiers of the eNBs 20 and the identifiers of the tracking areas are correlated with each other, and information (second information) in which the identifiers of the UEs 70 and the identifiers of the tracking areas are correlated with each other.

The information acquiring unit 13 is a unit that acquires information of the SGW-Us 50 having a tracking area to which the UE 70 newly belongs as a service area for the SGW-C 30.

Figure 3:
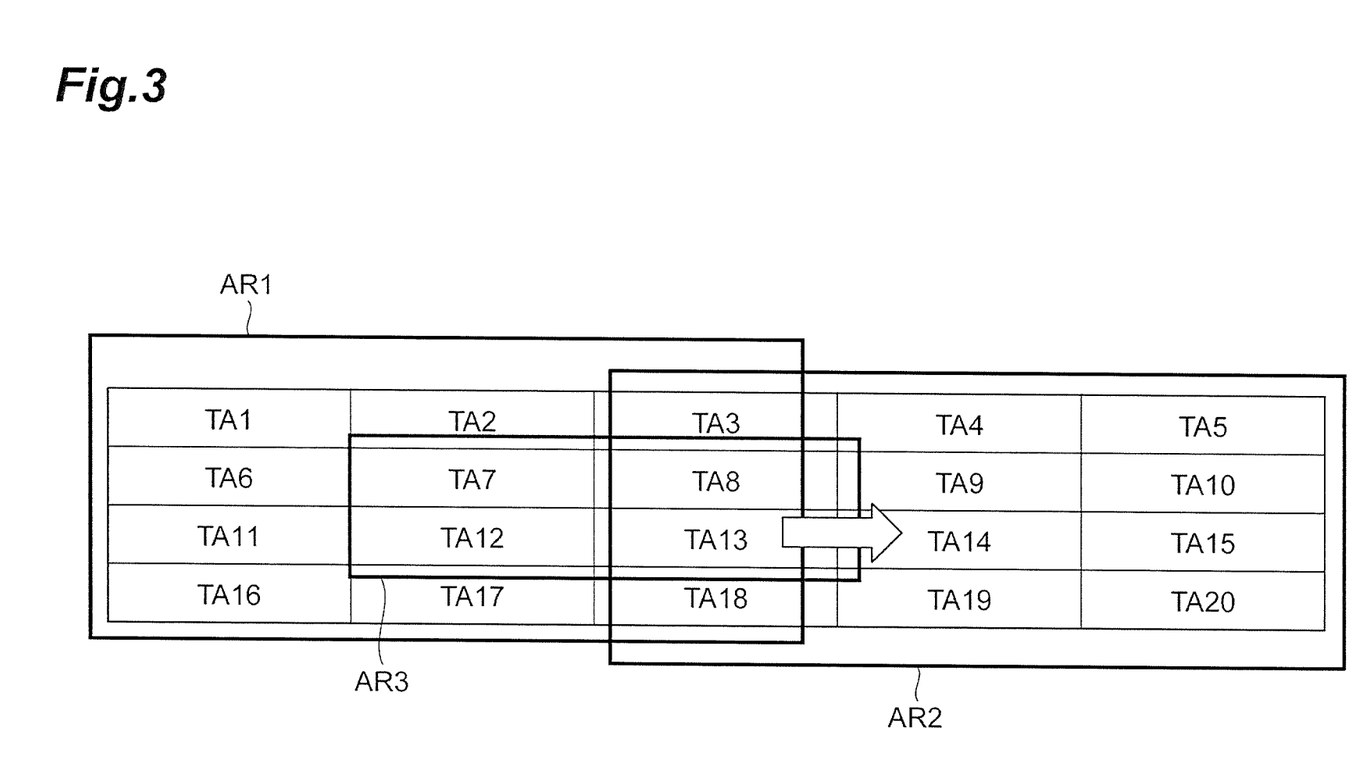
FIG. 3 is a diagram conceptually illustrating tracking areas.

A relationship between the tracking areas and the service area is illustrated in FIG. 3. As illustrated in FIG. 3, it is assumed that there are tracking areas TA1 to TA20, the service area of the SGW-U 50A is an area AR1, and the service area of the SGW-U 50B is an area AR2. An area AR3 listed in a TA list is allocated to the UE 70. When the UE 70 moves from TA13 to TA14, the UE 70 issues a tracking area update request. In this case, the MME 10 acquires information of the SGW-U 50 having the tracking area to which the UE 70 belongs as a service area, from the SGW-C 30. Accordingly, as illustrated in FIG. 3, when the UE 70 moves to a service area of another SGW-U 50, the MME 10 can appropriately identify the SGW-U 50 corresponding to the UE 70.

Specifically, the information acquiring unit 13 acquires the identifier of the UE 70 and the identifier of the eNB 20, from the request receiving unit 11. The information acquiring unit 13 identifies the identifier of the tracking area corresponding to the identifier of the eNB 20 with reference to the first information stored in the storage unit 12. In this way, the information acquiring unit 13 identifies the tracking area in which the UE 70 is located. The information acquiring unit 13 transmits the identifier of the identified tracking area to the SGW-C 30 and requests transmission of information of the SGW-U 50 having the tracking area to which the UE 70 belongs as a service area.

When the identifier of the SGW-U 50 is acquired from the SGW-C 30, the information acquiring unit 13 transmits the identifier of the SGW-U 50 to a domain name system (DNS). The DNS stores information in which identifiers of the SGW-Us 50 and IP addresses of the SGW-Us 50 are correlated with each other. When the identifier of the SGW-U 50 is received, the DNS identifies an IP address corresponding to the identifier of the SGW-U 50 with reference to the stored information, and transmits the IP address to the MME 10. When the IP address is received from the DNS which is not illustrated, the information acquiring unit 13 sends the IP address to the connection control unit 14.

The connection control unit 14 is a unit that performs various connection processes. When a paging request is received from the SGW-C 30, the connection control unit 14 performs paging to the eNBs 20. When the IP address is received from the information acquiring unit 13, the connection control unit 14 correlates the IP address with a TEID, and requests connection to the SGW-U 50 having the IP address.

Elements of the SGW-C 30 will be described next. The SGW-C 30 includes a request receiving unit 31, a storage unit 32 (acquisition means), and a retrieval unit 33 (determination means). The request receiving unit 31 is a unit that receives various requests. Specifically, the request receiving unit 31 receives an identifier of UE 70 and a paging request from an SGW-U 50, or receives a tracking area and a request for transmission of an SGW-U 50 corresponding to the tracking area from the MME 10. When a paging request is received from an SGW-U 50, the request receiving unit 31 transmits the identifier of the UE 70 and the paging request to the MME 10 in response thereto.

When a tracking area is received from the MME 10 and a request for transmission of an SGW-U 50 corresponding to the tracking area is received, the request receiving unit 31 sends information of the tracking area to the retrieval unit 33. The request receiving unit 31 acquires an SGW-U 50 retrieved by the retrieval unit 33 from the retrieval unit 33, and transmits information of the SGW-U 50 to the MME 10.

Figure 4:
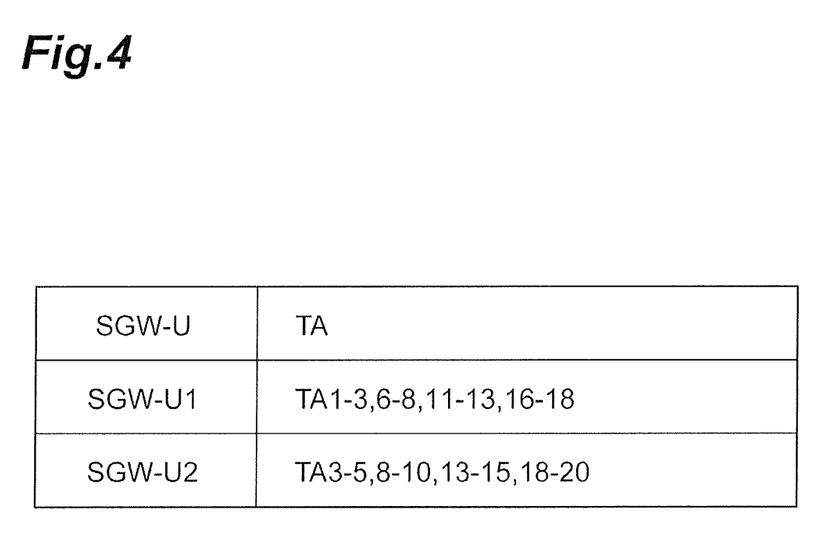
FIG. 4 is a diagram illustrating a data structure of correlation information.

The storage unit 32 is a unit that stores information (correlation information) in which SGW-Us 50 and tracking areas are correlated with each other. The storage unit 32 acquires and stores the correlation information in advance. Specifically, the storage unit 32 stores information in which identifiers of the SGW-Us 50 and identifiers of the tracking areas are correlated with each other, as illustrated in FIG. 4.

The retrieval unit 33 is a unit that retrieves an SGW-U 50 corresponding to the information of the tracking area (the tracking area of the movement destination of the UE 70) received from the MME 10 with reference to the information stored in the storage unit 32. When the information of a tracking area is acquired from the request receiving unit 31, the retrieval unit 33 retrieves the identifier of the SGW-U 50 corresponding to the tracking area with reference to the information stored in the storage unit 32. When the identifier of the SGW-U 50 corresponding to the tracking area is retrieved, the retrieval unit 33 sends the identifier of the SGW-U 50 to the request receiving unit 31.

Figure 5:
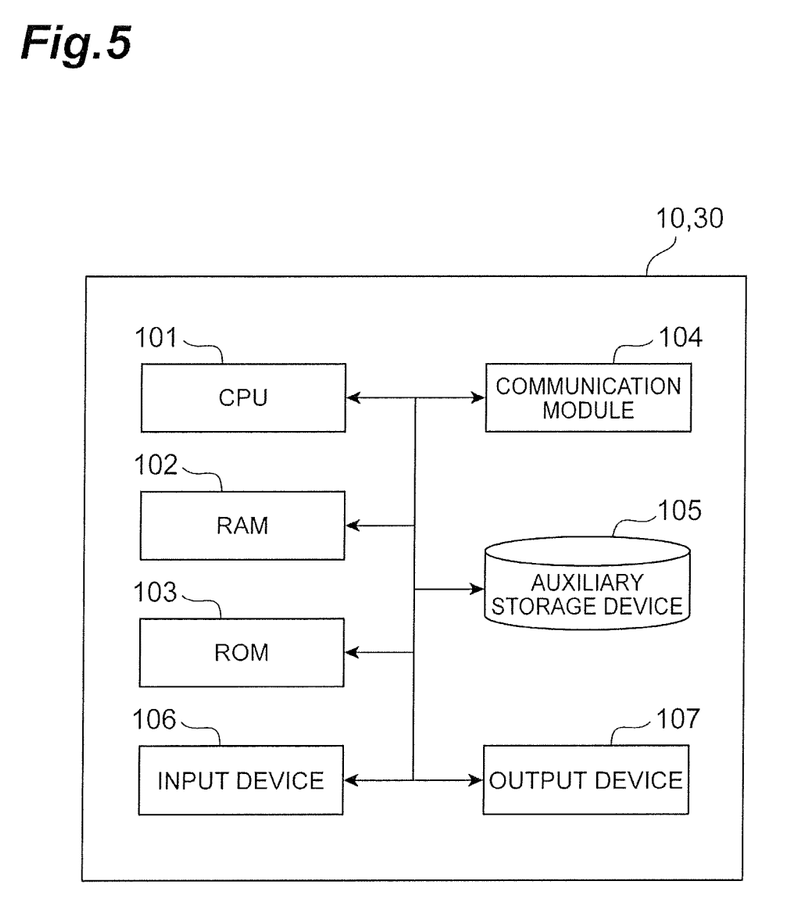
FIG. 5 is a diagram illustrating a hardware configuration of the MME device.

Physically, the MME 10 and the SGW-C 30 are configured as computer systems each including one or more CPUs 101, a RAM 102 and a ROM 103 which are main storage devices, a communication module 104 (a transmitter or a receiver) which is a data transmitting/receiving device, an auxiliary storage device 105 (memory) such as a hard disk or a flash memory, an input device 106 such as a touch panel and a keyboard as an input unit, and an output device 107 such as a display as illustrated in FIG. 5. In the MME 10 and the SGW-C 30, the communication module 104, the input device 106, and the output device 107 are operated under the control of the CPU 101 by causing the CPU 101 illustrated in FIG. 5 to read predetermined computer software into hardware such as the RAM 102, and various functions of the devices are realized by reading and writing data from and to the RAM 102 and the auxiliary storage device 105.

Instead of causing a processor such as the CPU 101 to perform the functions in FIG. 2, all or some of the functions may be performed by constructing a dedicated integrated circuit (IC). For example, the functions may be performed by constructing a dedicated integrated circuit for performing image processing or communication control.

Regardless of whether it is called software, firmware, middleware, microcode, hardware description language, or other names, software can be widely construed to refer to commands, a command set, codes, code segments, program codes, a program, a sub program, a software module, an application, a software application, a software package, a routine, a sub routine, an object, an executable file, an execution thread, an order, a function, or the like.

Software, a command, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

Figure 6:
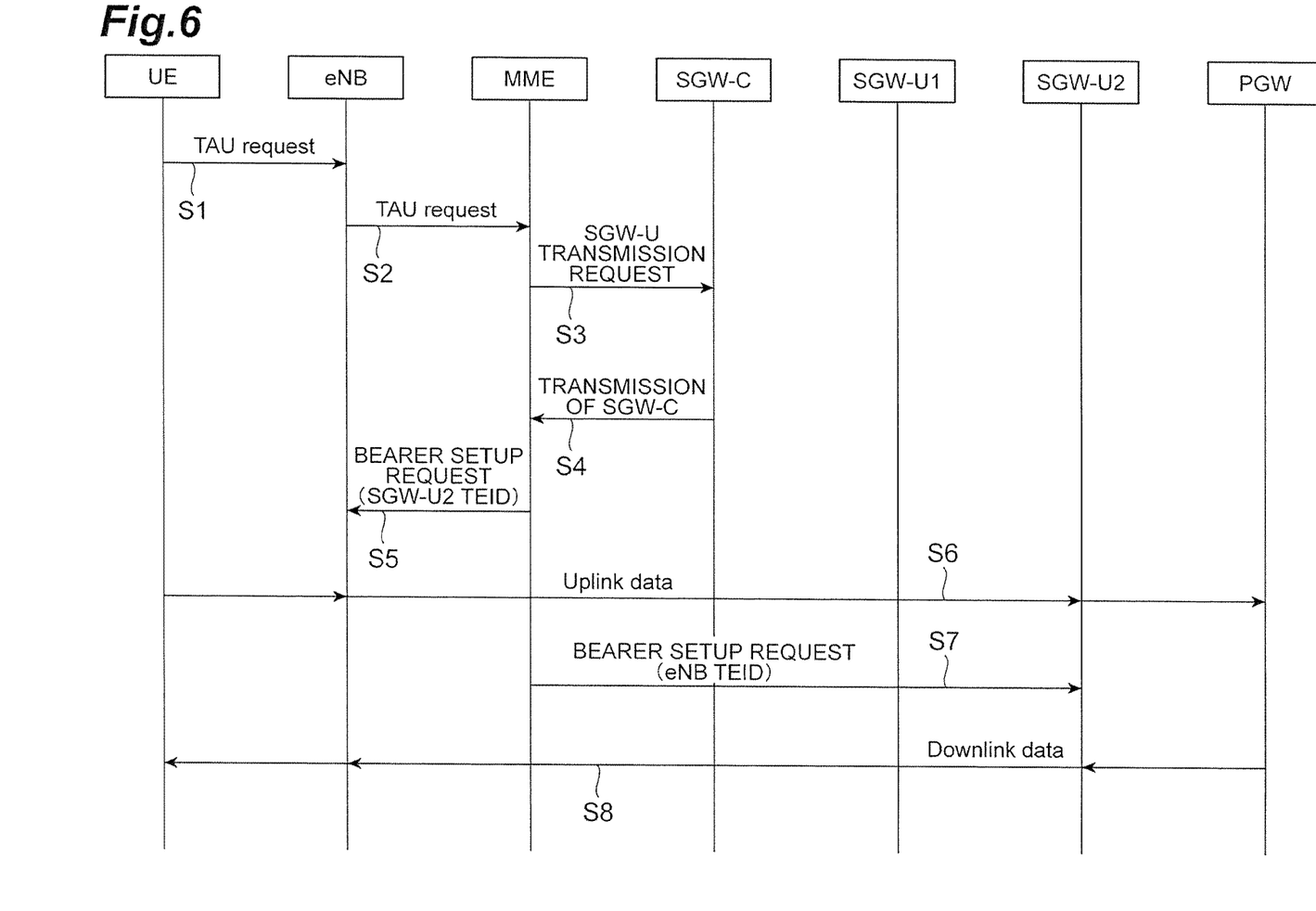
FIG. 6 is a sequence diagram illustrating a process routine of updating a tracking area in response to a tracking area update request from a UE.
Figure 7:
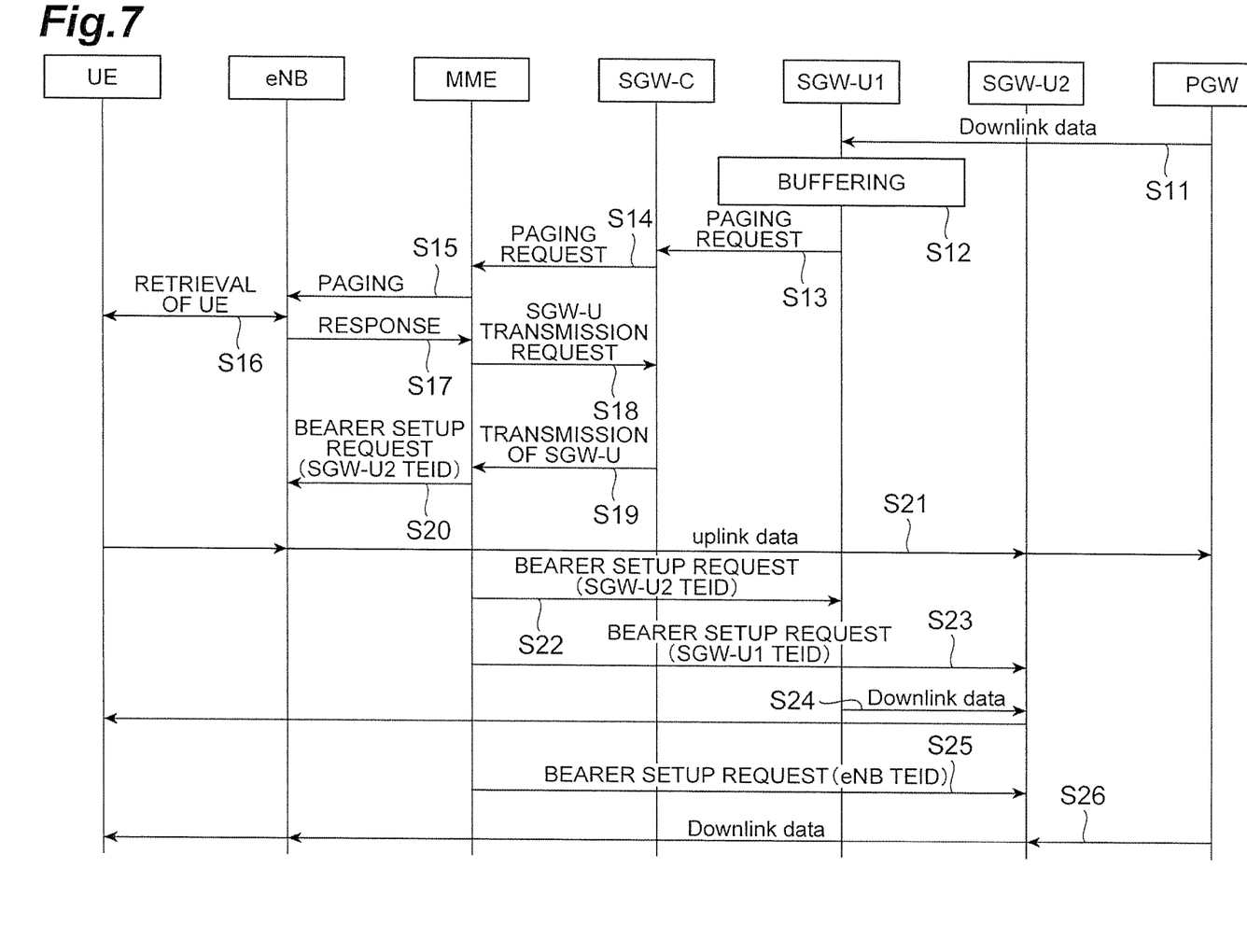
FIG. 7 is a sequence diagram illustrating a process routine of updating a tracking area by using a paging request as a trigger.

A communication control method in the communication system will be described next with reference to FIGS. 6 and 7. FIG. 6 is a sequence diagram illustrating a process routine of changing an SGW-CT 50 from the SGW-U 50A to the SGW-U 50B in response to a tracking area update request. FIG. 7 is a sequence diagram illustrating a process routine of changing an SGW-U 50 from the SGW-U 50A to the SGW-U 50B in response to a paging request. The storage unit 32 of the SGW-C 30 acquires correlation information in advance (an acquisition step).

First, the process routine of changing the SGW-U 50 will be described with reference to FIG. 6. First, when change of a tracking area has been recognized on the basis of information of the eNB 20 to which the UE 70 is connected, a tracking area update request (TAU request) is transmitted via the eNB 20 (Steps S1 and S2). The information acquiring unit 13 of the MME 10 identifies a tracking area corresponding to the identifier of the eNB 20 acquired from the eNB 20, transmits information of the tracking area to the SGW-C 30, and transmits a request for transmission of an SGW-U 50 corresponding to the tracking area thereto (Step S3). When the request for transmission is received by the request receiving unit 31, the retrieval unit 33 retrieves the identifier of the SGW-U 50 corresponding to the tracking area with reference to the information in the storage unit 32 (Step S4: a determination step). The request receiving unit 31 transmits the identifier of the SGW-U 50 retrieved by the retrieval unit 33 to the MME 10 (Step S4). The information acquiring unit 13 acquires the identifier of the SGW-U 50 from the SGW-C 30, transmits the identifier of the SGW-U 50 to the DNS, and acquires an IP address of the SOW-U 50 from the DNS.

The connection control unit 14 correlates the IP address with a TEID and requests the eNB 20 to be connected to the SGW-U 50B (Step S5: a connection request step). The eNB 20 sets up a bearer with the SGW-U 50B as a result. Accordingly, uplink data is transmitted from the UE 70 to the PGW-U 60 (Step S6). The connection control unit 14 correlates the TEID with the IP address of the eNB 20 stored in advance and requests the SGW-U 50B to be connected to the eNB 20 (Step S7). The SGW-U 50B sets up a bearer with the eNB 20 and downlink data is transmitted (Step S8).

The process routine of changing the SGW-U 50 in response to a paging request will be described next with reference to FIG. 7. It is premised that the UE 70 is in an idle mode (a state in which a non-communicating state is maintained for a predetermined time). The processes of Steps S18 to S21 and Steps S25 to S26 are the same as the processes of Steps S3 to S6 and Steps S7 to S8 and description thereof will be omitted. First, downlink data to the UE 70 is transmitted to the SGW-U 50A via the PGW-C 40 or the PGW-U 60 (Step S11). Since the UE 70 is in the idle mode, the SGW-U 50A determines that downlink data cannot be transmitted and buffers the downlink data (Step S12).

The SGW-U 50A transmits the identifier of the UE 70 as a destination, and transmits a paging request to the MIME 10 via the SGW-C 30 (Steps S13 and S14). The connection control unit 14 of the MME 10 transmits the received identifier of the UE 70 to the eNB 20 and performs paging (Steps S15 and S16). The corresponding UE 70 receives a paging request and transmits a response thereto via the eNB 20 (Steps S16 and S17). After uplink data is transmitted in Step S21, the connection control unit 14 correlates the IP address of the SGW-U 50B with a TEID and requests the SGW-U 50A to be connected to the SGW-U 50B (Step S22). The connection control unit 14 correlates the IP address of the SGW-U 50A with a TEID and requests the SGW-U 50B to be connected to the SGW-U 50A (Step S23). In this way, the connection control unit 14 transmits a request for connection between the SGW-U 50A corresponding to the tracking area to which the UE 70 belongs before it moves (for example, before it becomes an idle mode) and the SGW-U 50B corresponding to the tracking area to which the UE 70 belongs after it moves. Accordingly, downlink data is transmitted from the SGW-U 50A to the UE 70 via the SGW-U 50B (Step S24). In this way, the SGW-U 50A transmits downlink data buffered therein to the SGW-U 50B.

As described above, the SGW-C 30 acquires correlation information in advance and retrieves an SGW-U 50 corresponding to a tracking area of a movement destination of the UE 70 with reference to the correlation information. The MME 10 transmits a request for connection between the SGW-U 50 retrieved by the SGW-C 30 and the eNB 20. In this way, since the correlation information in which the SGW-Us 50 and the tracking areas are correlated with each other is stored, it is possible to appropriately change a tracking area even in a situation in which a control plane and a user plane are separated.

On the basis of a paging response from the connection control unit 14 of the MME 10, the SGW-C 30 retrieves the SGW-U 50 corresponding to the tracking area of the movement destination of the UE 70. In this case, it is possible to appropriately change a tracking area depending on the paging.

When a tracking area change request is received from the eNB 20, the SGW-C 30 retrieves the SGW-U 50 corresponding to the tracking area of the movement destination of the UE 70. In this case, it is possible to appropriately change a tracking area in response to the tracking area change request.

The connection control unit 14 of the MME 10 requests the SGW-U 50A corresponding to the tracking area to which the UE 70 belongs before it moves, to be connected to the SGW-U 50B. After the connection has been set up, buffering data is transmitted from the SGW-U 50A to the SGW-U SOB. In this way, even when the SGW-U 50A buffers downlink data, the MME 10 can transmit the downlink data to the SGW-U 50B.

In the above-mentioned embodiment, an example in which the storage unit 32 of the SGW-C 30 stores the correlation information has been described above, but the MME 10 may store the correlation information. In this case, correlation information in which the SGW-C 30, an SGW-U 50 managed by the SGW-C 30 and the tracking areas of the service area of the SGW-U 50 are correlated is considered to be stored.

"Information" described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The term "determination" as used in this specification may include various types of operations. The term "determination" encompasses calculating, computing, processing, deriving, investigating, looking up (for example, looking up in a table, a database, or another data structure), and ascertaining. The term, "determination," encompasses receiving (for example, receiving information) and accessing (for example, accessing data in a memory). The term "determination" encompasses resolving, selecting, choosing, establishing, and comparing.

The expression "on the basis of" as used in this specification does not mean "on the basis of only" unless otherwise described. In other words, the expression "on the basis of" means both "on the basis of only" and "on the basis of at least."

The order of the processing sequences, the sequences, the flowcharts, and the like of the aspects/embodiments described above in this specification may be changed as long as it does not cause any inconsistencies. For example, in the methods described in this specification, various steps are described as elements in an exemplary order but the methods are not limited to the described order.

The aspects described in this specification may be used alone, may be used in combination, or may be switched during implementation thereof. Transmission of predetermined information (for example, transmission of "X") is not limited to explicit transmission, and may be performed by implicit transmission (for example, the predetermined information is not transmitted).

While the invention has been described above in detail, it is apparent to those skilled in the art that the invention is not limited to the embodiment described in this specification. The invention can be modified and altered in various forms without departing from the gist and scope of the invention defined by description in the appended claims. Accordingly, description in this specification is for exemplary explanation, and does not have any restrictive meaning for the invention.

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements are employed or that the first element has to precede the second element in any form.

The terms described in this specification and/or the terms required for understanding this specification may be substituted by terms having the same or similar meanings.

The terms "system" and "network" are used synonymously in this specification.

Information, parameters, and the like described in this specification may be expressed as absolute values, may be expressed by values relative to a predetermined value, or may be expressed by other corresponding information. For example, radio resources may be indicated by indices.

When the terms "include," "including," and modifications thereof are used in this specification or the appended claims, the terms are intended to have a comprehensive meaning similar to the term "comprise." The term "or" which is used in this specification or the claims is not intended to mean an exclusive logical sum.

The aspects/embodiments described in this specification may be applied to systems employing Long Term Evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended on the basis thereof.

The input or output information or the like may be stored in a specific place (for example, a memory) or may be managed in a management table. The input or output information or the like may be overwritten, updated, or added to. The output information or the like may be deleted. The input information or the like may be deleted. The input information or the like may be transmitted to another device.

In the whole disclosure, singular terms can refer to both singular and plural referents unless it is clearly indicated otherwise.

REFERENCE SIGNS LIST

10: MME; 11: request receiving unit; 12: storage unit; 13: information acquiring unit; 14: connection control unit; 20: eNB (base station); 30: SGW-C (first device); 31: request receiving unit; 32: storage unit; 33: retrieval unit; 40: PGW-C; 50: SGW-U (second device); 60: PGW-U; 70: UE (terminal).

The invention claimed is:

1. A communication control method which is performed in a communication system, the communication control method comprising:
   acquiring correlation information in which a first device that has processing circuitry configured to transmit and receive a control signal for a communication service used by a terminal using a control plane which is a path for transmitting the control signal, a second device, from a plurality of second devices, that has processing circuitry configured to transmit and receive transmits and receives a user signal for a communication service using a user plane which is a path for transmitting the user signal, and a tracking area of the second device are correlated with one another;
   determining a second device from the plurality of second devices corresponding to a tracking area of a movement destination of the terminal with reference to the correlation information acquired in the acquiring; and
   issuing a request for connection between the second device determined in the determining and a base station,
   wherein the determining is performed on the basis of a paging response, and
   wherein the issuing a request includes:
   issuing a request for connection between the second device corresponding to a tracking area before the terminal moves and the second device determined in the determining, before issuing a request for connection between the second device and the base station; and
   transmitting, on the basis of a paging response, buffered data from the second device corresponding to the tracking area before the movement to the determined second device, after the connection has been set up.

2. The communication control method according to claim 1, wherein the determining is performed after a tracking area change request has been received from the base station.

\* \* \* \* \*